(12) United States Patent
Hashemi

(10) Patent No.: US 7,140,354 B1
(45) Date of Patent: Nov. 28, 2006

(54) COMPRESSED GASEOUS FUEL SYSTEM FOR INTERNAL COMBUSTION ENGINE

(75) Inventor: Siamak Hashemi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/162,123

(22) Filed: Aug. 30, 2005

(51) Int. Cl.
*F02M 69/46* (2006.01)
*F02M 59/36* (2006.01)
*F02B 43/00* (2006.01)

(52) U.S. Cl. .................. 123/456; 123/527; 123/511
(58) Field of Classification Search ............. 123/456, 123/468, 469, 472, 525, 526, 527, 528, 529, 123/457, 458, 459, 497, 510, 511, 514, 27 GE; 73/116, 117.3, 118.1; 137/486, 487.5
See application file for complete search history.

(56) References Cited

U.S. PATENT DOCUMENTS

| | | | | |
|---|---|---|---|---|
| 4,619,240 A | * | 10/1986 | Bedford et al. | ............. 123/575 |
| 5,329,908 A | * | 7/1994 | Tarr et al. | .................... 123/527 |
| 5,351,656 A | | 10/1994 | Teramoto et al. | |
| 5,367,999 A | | 11/1994 | King et al. | |
| 5,373,824 A | * | 12/1994 | Peters et al. | ................. 123/527 |
| 5,531,199 A | * | 7/1996 | Bryant et al. | ................ 123/527 |
| 5,619,972 A | * | 4/1997 | Kuenzli et al. | ............. 123/511 |
| 5,632,250 A | | 5/1997 | Kato et al. | |
| 6,325,048 B1 | * | 12/2001 | Robinson | .................... 123/456 |
| 6,427,670 B1 | | 8/2002 | Goto et al. | |
| 6,484,699 B1 | * | 11/2002 | Paul et al. | .................. 123/525 |
| 6,598,584 B1 | * | 7/2003 | Beck et al. | ................. 123/563 |
| 6,826,950 B1 | * | 12/2004 | Lecea et al. | ................ 73/118.1 |
| 6,889,705 B1 | * | 5/2005 | Newman et al. | ......... 137/487.5 |

FOREIGN PATENT DOCUMENTS

WO         WO 03/001045 A1  *   1/2003   ................. 123/456

* cited by examiner

*Primary Examiner*—Willis R. Wolfe, Jr.
(74) *Attorney, Agent, or Firm*—Gary A. Smith

(57) ABSTRACT

A compressed gaseous fuel system for an internal combustion engine includes an electronic engine controller, a common fuel rail, fuel injectors operatively connected with the common-rail and with the engine controller, and a high pressure gaseous fuel source. A control regulator reduces gas system pressure to a final variable control pressure specified by the engine controller and furnishes the fuel at the control pressure to the common-rail. A fuel pump operatively connected with the control regulator and with the engine controller selectively transfers fuel from the fuel rail to a portion of the fuel system located upstream from the downstream pressure regulator in the event that the pressure within the common-rail exceeds a desired pressure.

13 Claims, 3 Drawing Sheets

US 7,140,354 B1

COMPRESSED GASEOUS FUEL SYSTEM FOR INTERNAL COMBUSTION ENGINE

TECHNICAL FIELD

The present invention is related to a system for providing fuel, stored as a compressed gas, to an internal combustion engine, with the fuel being provided through a common-rail/injector combination.

BACKGROUND

Common-rail fuel injection systems have been in general use for many years with gasoline-fueled internal combustion engines. Lately, common-rail systems have been used with diesel engines. Common-rail systems typically use a fuel pump to provide pressurized fuel, most often in a liquid form, to the fuel rail. In turn, injectors which are plugged into or otherwise operatively connected with a fuel rail, furnish fuel to the engine's cylinders. When compressed gas is used for an internal combustion engine fuel, the high pressure gas in the fuel tank is stepped down in pressure using one or more pressure regulators, and a fuel pump is generally not needed.

Given the comparatively low density of gaseous fuel, as compared with liquid fuels, it is necessary to handle a much higher volume of gaseous fuel than would otherwise be the case were liquid fuel to be used. This results in the need for gaseous fuel injectors to have a very large range of authority as compared with injectors used for injecting liquid fuels.

The amount of gas injected per injection event by gaseous fuel injectors may be controlled not only by the pulse width furnished to the injector solenoid, but also by the common-rail pressure. As shown in FIG. 3, as common-rail pressure increases, fuel delivery increases concomitantly for equal duration injection events. A problem may arise, however, where it is desired to transition from a higher injection rate to a lower mass injection per injection event. Although less fuel may be injected by decreasing the injector pulse width, this does not always produce desirable results at low flows because the desired amount of fuel may be less than the range of authority of the injector at the pressure available within the common-rail. This is a problem where it is desired to inject small amounts of fuel, given that the fuel rail represents a relatively larger volume, sometimes at a higher pressure than is desired.

When the pressure within the fuel rail is higher than desired, it is necessary to remove some of the gaseous fuel from the rail other than by running the fuel through the injectors. Although it would be possible to simply release the fuel to the atmosphere, the negative impact on fuel economy is an obvious deterrent to such a strategy. The problem of how to reintroduce a fuel to the fuel system is solved by the present invention. By removing some of the fuel from the fuel rail and by recompressing the fuel and injecting fuel into the fuel system upstream of the common-rail, the rail pressure may be reduced to the desired value without wasting fuel. The present inventive system solves the problems that prior art fuel systems experience in handling compressed gas while at the same time achieving a dynamic range of response of injectors by varying the common-rail fuel pressure.

SUMMARY

A compressed gaseous fuel system for an internal combustion engine includes an electronic engine controller, a common fuel rail, a plurality of fuel injectors operatively connected with the common-rail and with the engine controller, and a high pressure gaseous fuel source. An upstream pressure regulator connected with the high pressure fuel source reduces the source pressure to a first working pressure. A downstream pressure regulator, connected with an outlet of the upstream pressure regulator reduces the first working pressure to a second working pressure. A control regulator, operatively connected with the downstream pressure regulator, reduces the second working pressure to variable control pressure commanded by the engine controller, and furnishes fuel at the control pressure to the common fuel rail. Finally, a fuel pump, operatively connected with the control regulator and the engine controller selectively transfers fuel from the fuel rail to a portion of the fuel system located upstream from the downstream pressure regulator.

In a preferred embodiment, a fuel pump transfers fuel from the fuel rail to a port located in a passage extending from the outlet of the upstream pressure regulator to the inlet of the downstream pressure regulator. The fuel pump may transfer fuel from the fuel rail to the high pressure gaseous fuel source, which may comprise a tank of compressed hydrogen, or a tank of compressed natural gas, or a tank of other types of compressed fuel gases. A fuel pump preferably transfers, in one embodiment, fuel from the fuel rail to a port located in a passage extending from the outlet of the upstream pressure regulator to the inlet of the downstream pressure regulator. In essence, the fuel pump compresses the fuel and reinjects it into an upstream portion of the fuel system at a pressure greater than a pressure within the fuel rail.

According to another aspect of the present invention, a method for controlling the pressure within a common-rail fuel system for furnishing compressed gaseous fuel to an internal combustion engine includes the steps of providing a supply of compressed fuel operatively connected with the fuel rail, determining a desired fuel rail pressure, measuring the fuel pressure within the fuel rail, and in the event that the measured fuel rail pressure is less than the desired fuel rail pressure, admitting more fuel from the supply of compressed fuel into the fuel rail. The present method also includes a step that in the event the measured fuel rail pressure is greater than a desired fuel rail pressure, fuel will be pumped from the fuel rail to the supply of compressed fuel. As described above, the supply of compressed fuel may comprise a high pressure tank of hydrogen with fuel being pumped into the tank in the event that the measured fuel rail pressure is greater than the desired fuel rail pressure. As an alternative, in a system including at least two stepped-down pressure regulators attached in series to the pressure tank of hydrogen, fuel may be pumped into the passage extending between the regulators in the event that the measured fuel rail pressure is greater than the desired fuel rail pressure.

It is an advantage of a method and system according to the present invention that a compressed gaseous fuel common-rail fuel system for an internal combustion engine may be operated with a large range of authority facilitated by the ability to reduce fuel rail pressure during a transition, without wasting fuel, by virtue of the fact that the fuel is recompressed and introduced in the fuel system upstream of the fuel rail.

It is a further advantage of a method and system according to the present invention that engine fueling may be precisely controlled without the expense and complexity attendant use of multiple injectors for the same engine cylinder. In other words, rather than using two injectors having limited range of authority, a single injector, when combined with the inventive system, will have a very great range of authority, which will obviate the need for costly redundant injectors.

Other advantages, as well as features and objects of the present invention, will become apparent to the reader of this specification.

DETAILED DESCRIPTION OF THE PREFERRED EMBODIMENTS

Figure 1:
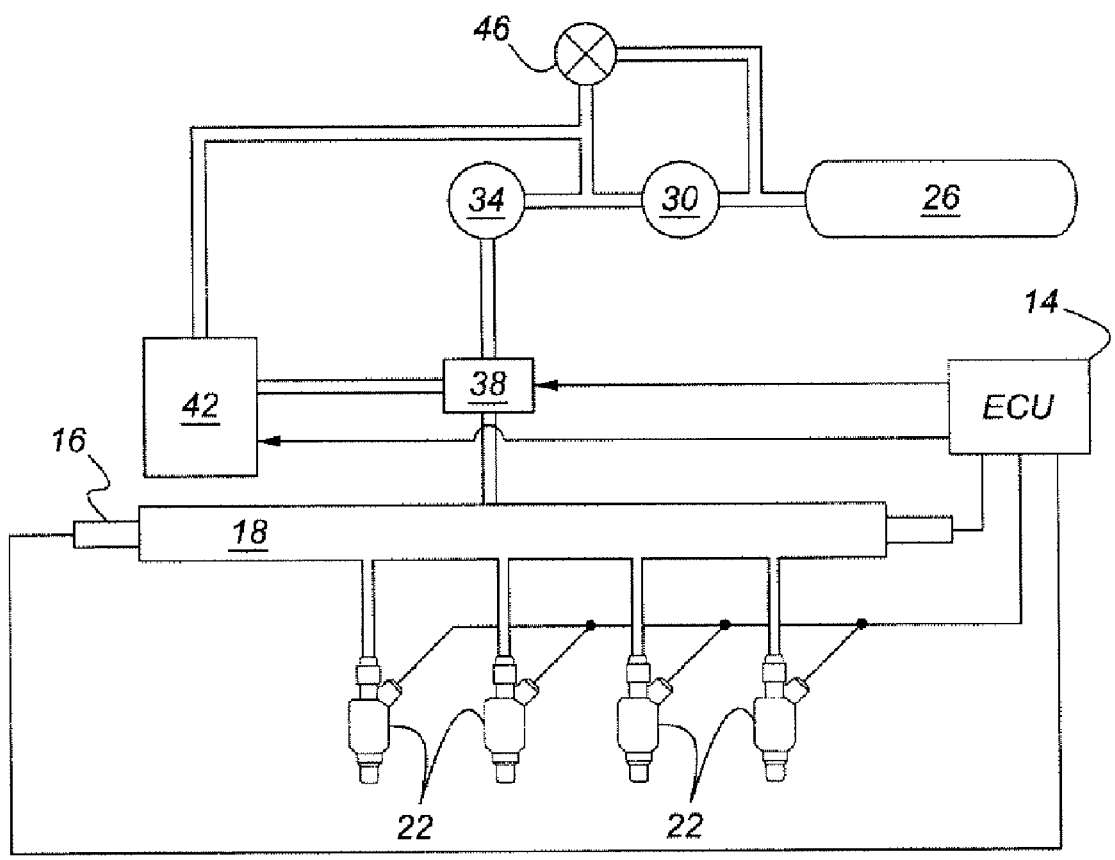
FIG. 1 is a schematic representation of an internal combustion engine compressed gaseous fuel system according to the present invention.

In the following figures the same reference numerals will be used to illustrate the same components.

As shown in FIG. 1, a compressed gaseous fuel system includes a tank of compressed fuel, 26. Alternatively, the present system may utilize other sources of high pressure gaseous fuel, such as a compressor station. The fuel may be either natural gas, hydrogen, or some other compressed gas fuel known to those skilled in the art and suggested by this disclosure. Fuel from tank 26 moves to upstream pressure regulator 30, wherein the pressure is reduced from the tank pressure, which may run up to the vicinity of 5000 psi or more, to a first reduced pressure of about 400 psi. Pressure regulator 30 is deemed to be the upstream pressure regulator. Once the fuel leaves upstream pressure regulator 30, it moves to downstream pressure regulator 34, wherein the fuel is reduced to about 200 psi. Then, the fuel moves to control regulator 38, which is operated by electronic control unit 14. The electronic control unit operates control regulator 38 so as to reduce the fuel at the second working pressure, in this case about 200 psi, to a variable control pressure commanded by ECU 14.

Figure 3:
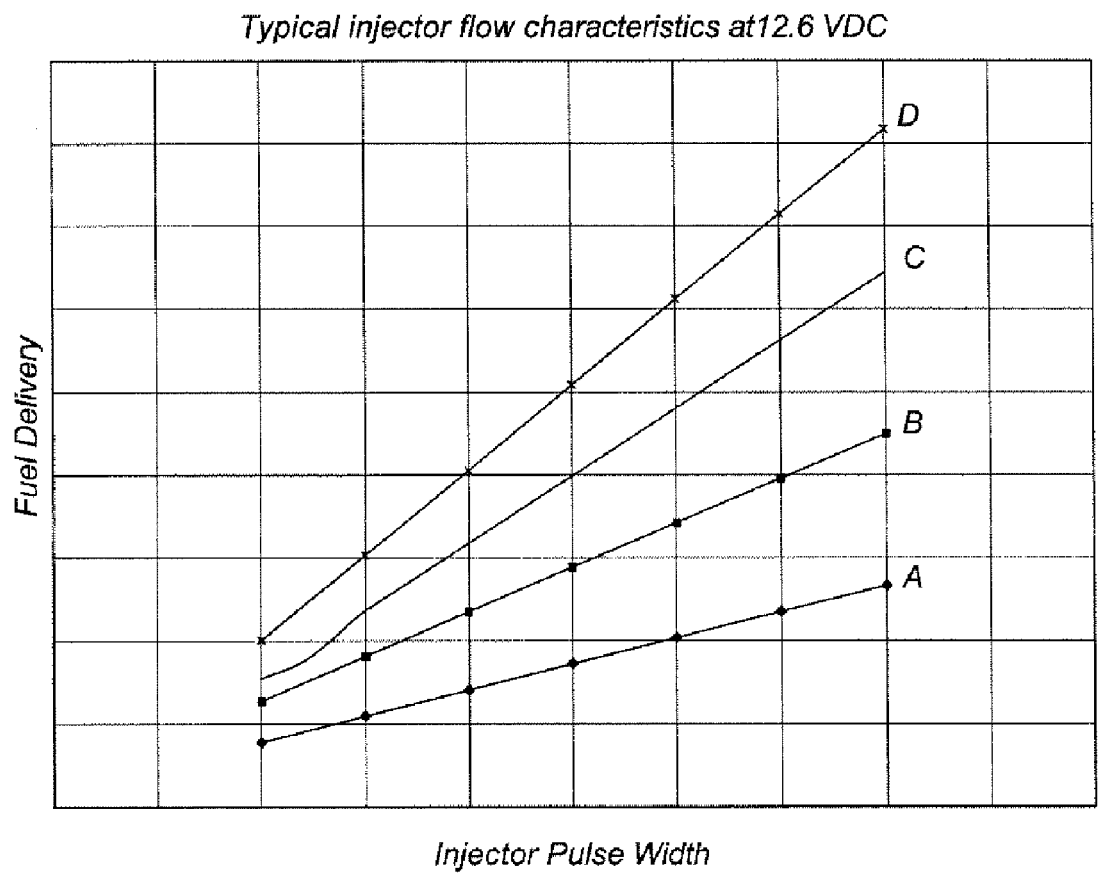
FIG. 3 is a plot showing fuel delivery versus time, for typical gaseous fuel injectors, operated at a number of desired common-rail pressures.

FIG. 3 contains performance curves plotted at various injector pulse widths, and variable common-rail pressures, A, B, C, and D. Fuel delivery may be increased or decreased by changing the fuel pressure, and this is what ECU 14 accomplishes working in concert with control regulator 38.

Fuel flows from control regulator 38 to common fuel rail 18. A number of injectors 22 are plugged into common fuel rail 18, and injectors 22 are also operatively connected with electronic control unit 14, which controls injectors 22 by means of a pulse width modulation control scheme.

If it is desired to inject more fuel at a constant pulse width, the pressure within common-rail 18 may be increased from A to B, or A to C, or A to D, or B to D as shown in FIG. 3. If, however, it is desired to inject less fuel at a constant pulse width, it may be necessary to reduce the pressure from level D to level C or level B, or to some other, lower, pressure. This may be accomplished by transferring fuel from common fuel rail 18 to a portion of the fuel system located upstream from downstream pressure regulator 34. In essence, when activated by ECU 14, pump 42 recompresses fuel withdrawn from a common-rail port of control regulator 38. The fuel is re-compressed to a pressure above that existing between upstream pressure regulator 30 and downstream pressure regulator 34. Then, with the newly reduced pressure within fuel rail 18, the desired amount of fuel may be injected in an accurate, precise and repeatable manner.

If it is desired to reinject fuel into high pressure tank 26, valve 46, which is also controlled by ECU 14, may be opened and fuel compressed by pump 42 may be forced into fuel tank 26. In this manner, downstream pressure regulator 34 may be dispensed with, because upstream pressure regulator 30 will provide a constant pressure source of gas to control regulator 38.

Figure 2:
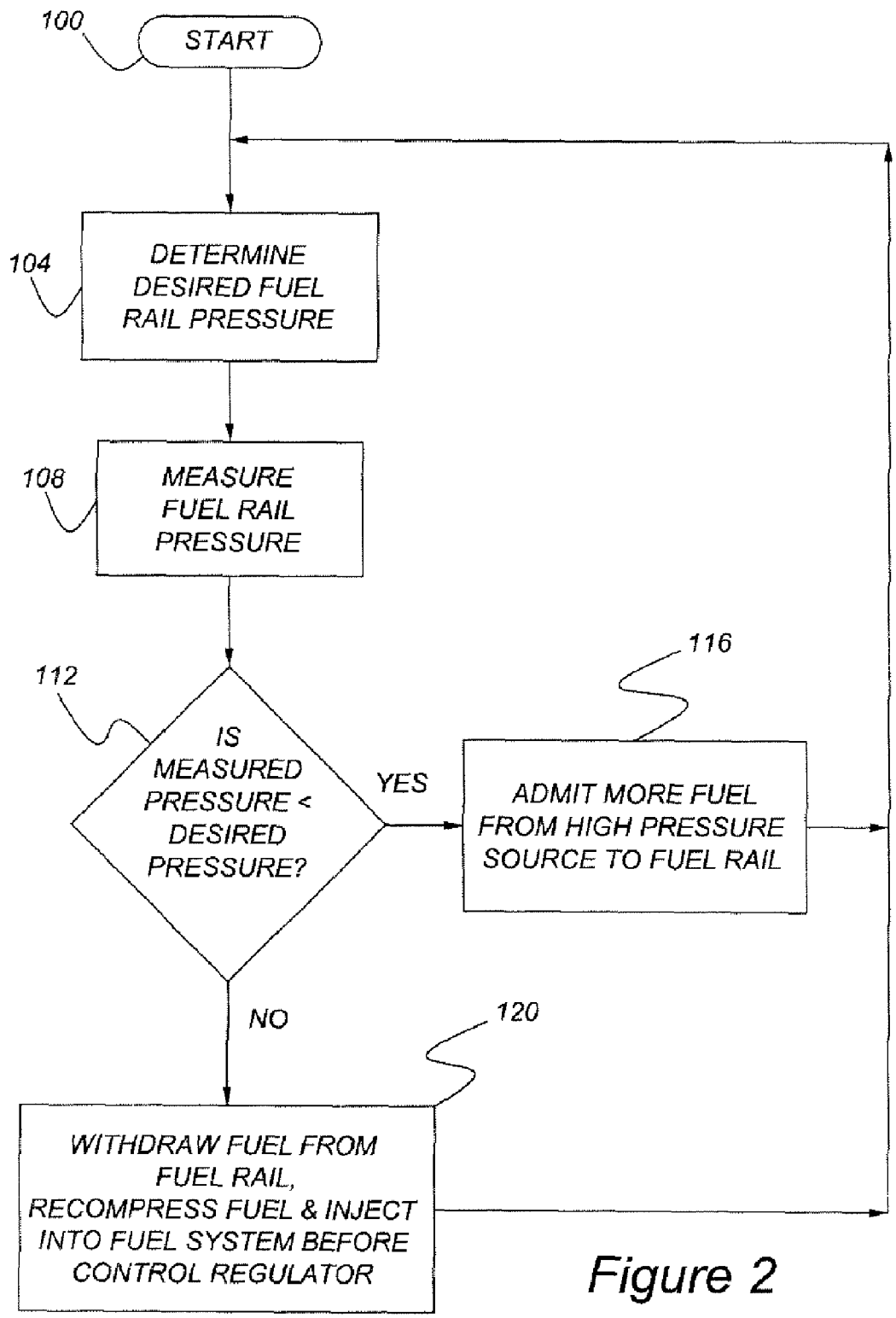
FIG. 2 is a flow chart illustrating a method according to one aspect of the present invention.

According to the method shown in FIG. 2, control of common-rail pressure starts at block 100 and then moves to block 104, where the desired fuel rail pressure is determined. The desired pressure may be determined from a look-up table populated with data similar to those exhibited in FIG. 3. Thus, for a desired pulse width and fuel delivery, the rail pressure may be selected from a table. Then, moving to block 108, ECU 14 measures fuel rail pressure using pressure sensor 16. Temperature sensor 17 may also be employed in a calculation leading up to block 112, wherein the measured pressure is compared with the desired fuel rail pressure. If, at block 112 the measured pressure is less than the desired pressure, the routine moves to block 116 wherein more fuel is emitted from high pressure source, via the pressure regulators and control regulator 38 into fuel rail 18. If, however, the answer is "no" at block 112, the measured pressure is therefore greater than the desired pressure, and the routine moves to block 120, wherein pump 42 withdraws fuel from fuel rail 18, recompresses the fuel and injects the fuel into the fuel system upstream from control regulator 38.

While particular embodiments of the invention have been shown and described, numerous variations and alternate embodiments will occur to those skilled in the art. Accordingly, it is intended that the invention be limited only in terms of the appended claims.

What is claimed is:

1. A compressed gaseous fuel system for an internal combustion engine, comprising:
   an electronic engine controller;
   a common fuel rail;
   a plurality of fuel injectors operatively connected with said common-rail and with said engine controller;
   a high pressure gaseous fuel source;
   an upstream pressure regulator, connected with the high pressure fuel source, for reducing the source pressure to a first working pressure;
   a downstream pressure regulator, connected with an outlet of the upstream pressure regulator, for reducing the first working pressure to a second working pressure;
   a control regulator, operatively connected with the downstream pressure regulator, for reducing the second working pressure to a variable control pressure commanded by said engine controller, and for furnishing fuel at the control pressure to said common fuel rail; and
   a fuel pump, operatively connected with said control regulator and said engine controller, for selectively transferring fuel from the fuel rail to a portion of said fuel system located upstream from said downstream pressure regulator.

2. A compressed gaseous fuel system according to claim 1, wherein said fuel pump transfers fuel from the fuel rail to a port located in a passage extending from the outlet of said upstream pressure regulator to the inlet of said downstream pressure regulator.

3. A compressed gaseous fuel system according to claim 1, wherein said fuel pump transfers fuel from the fuel rail to said high pressure gaseous fuel source.

4. A compressed gaseous fuel system according to claim 1, wherein said gaseous fuel source comprises a tank of compressed hydrogen.

5. A compressed gaseous fuel system according to claim 1, wherein said gaseous fuel source comprises a tank of compressed natural gas.

6. A compressed gaseous fuel system according to claim 1, wherein said fuel pump transfers fuel from the fuel rail to a port located in a passage extending from the outlet of said upstream pressure regulator to the inlet of said downstream pressure regulator.

7. A compressed gaseous fuel system according to claim 1, wherein said fuel pump transfers fuel from the fuel rail to a port located in a passage extending from the outlet of said upstream pressure regulator to the inlet of said downstream pressure regulator at a pressure greater than the pressure within said fuel rail.

8. A compressed gaseous fuel system for an internal combustion engine, comprising:
    an electronic engine controller;
    a common fuel rail;
    a plurality of fuel injectors operatively connected with said common-rail and with said engine controller;
    a high pressure gaseous fuel source;
    a control regulator, operatively connected with the high pressure gaseous fuel source, for reducing the fuel pressure to a variable control pressure commanded by said engine controller, and for furnishing fuel at the control pressure to said common fuel rail; and
    a fuel pump, operatively connected with said fuel rail and said engine controller, for selectively reducing the fuel pressure within said common fuel rail by compressing gaseous fuel drawn from the fuel rail to a pressure greater than the pressure of the fuel being furnished to said control regulator, and by injecting the compressed fuel into a portion of said fuel system located upstream from said control regulator.

9. A compressed gaseous fuel system according to claim 8, further comprising:
    an upstream pressure regulator, connected between the high pressure fuel source and the control regulator, for reducing the source pressure to a first working pressure; and
    a downstream pressure regulator, located between said upstream pressure regulator and said control regulator, with said fuel system further comprising a port located between said upstream regulator and said downstream regulator for receiving compressed gas from said fuel pump.

10. A method for controlling the pressure within a common-rail fuel system for furnishing compressed gaseous fuel to an internal combustion engine, comprising the steps of:
    providing a supply of compressed fuel operatively connected with a fuel rail;
    determining a desired fuel rail pressure;
    measuring the fuel pressure within the fuel rail;
    in the event that the measured fuel rail pressure is less than the desired fuel rail pressure, admitting more fuel from said supply of compressed fuel to the fuel rail; and
    in the event that the measured fuel rail pressure is greater than the desired fuel rail pressure, pumping fuel from the fuel rail to said supply of compressed fuel.

11. A method according to claim 10, wherein said supply of compressed fuel comprises a high pressure tank of hydrogen, with fuel being pumped into said tank in the event that the measured fuel rail pressure is greater than the desired fuel rail pressure.

12. A method according to claim 10, wherein said supply of compressed fuel comprises a high pressure tank of hydrogen having at least two step-down pressure regulators attached in series thereto, with fuel being pumped into a passage extending between said regulators in the event that the measured fuel rail pressure is greater than the desired fuel rail pressure.

13. A method according to claim 10, wherein said supply of compressed fuel comprises a high pressure tank of natural gas.

* * * * *